United States Patent
Poszmik et al.

(10) Patent No.: US 6,887,295 B2
(45) Date of Patent: May 3, 2005

(54) POWDER METALLURGY LUBRICANTS, COMPOSITIONS, AND METHODS FOR USING THE SAME

(75) Inventors: George Poszmik, Mt. Laurel, NJ (US); Sydney Luk, Lafayette Hill, PA (US)

(73) Assignee: Hoeganaes Corporation, Cinnaminson, NJ (US)

( * ) Notice: Subject to any disclaimer, the term of this patent is extended or adjusted under 35 U.S.C. 154(b) by 189 days.

(21) Appl. No.: 10/280,810

(22) Filed: Oct. 25, 2002

(65) Prior Publication Data

US 2004/0079192 A1 Apr. 29, 2004

(51) Int. Cl.$^7$ ............................... B22F 1/00; B22F 3/00
(52) U.S. Cl. ........................... 75/252; 419/65; 419/66; 508/421; 508/433; 508/441; 508/443; 508/444; 508/185; 508/150; 508/389; 508/390
(58) Field of Search ............................ 75/252; 419/65, 419/66; 508/421, 433, 441, 443, 444, 185, 150, 389, 390

(56) References Cited

U.S. PATENT DOCUMENTS

| | | | |
|---|---|---|---|
| 4,483,905 A | 11/1984 | Engstrom | 428/570 |
| 4,834,800 A | 5/1989 | Semel | 106/403 |
| 5,104,579 A | 4/1992 | Benjamin et al. | 252/46.6 |
| 5,154,881 A | 10/1992 | Rutz et al. | 419/37 |
| 5,160,725 A | 11/1992 | Pilgrimm | 424/9 |
| 5,256,185 A | 10/1993 | Semel et al. | 75/255 |
| 5,290,336 A | 3/1994 | Luk | 75/231 |
| 5,435,927 A * | 7/1995 | Beckwith et al. | 508/501 |
| 5,445,749 A | 8/1995 | Hong | 252/33.6 |
| 5,498,276 A | 3/1996 | Luk | 75/252 |
| 5,518,639 A | 5/1996 | Luk et al. | 252/29 |
| 5,767,044 A * | 6/1998 | Bigelow et al. | 508/186 |
| 5,837,658 A | 11/1998 | Stork | 508/421 |
| 6,140,278 A | 10/2000 | Thomas et al. | 508/150 |

OTHER PUBLICATIONS

PCT International Search Report dated Apr. 7, 2004 (PCT/US03/22455).

\* cited by examiner

Primary Examiner—Ngoclan T. Mai
(74) Attorney, Agent, or Firm—Woodcock Washburn LLP

(57) ABSTRACT

The present invention relates to improved metallurgical powder compositions that incorporate solid lubricants, methods for preparing and using the same, and methods of making compacted parts. Ejection properties, such as stripping pressure and sliding pressure, of compacted parts can be improved by using the solid lubricants. The solid lubricants contain functionalized polyalkylene glycol lubricants that contain a phosphate group, phosphite group, hypophosphate group, hypophosphite group, polyphosphate group, thiophosphate group, dithiophosphate group, thiocarbamate group, dithiocarbamate group, borate group, thiosulfate group, sulfate group, a sulfonate group or combinations thereof.

34 Claims, No Drawings

POWDER METALLURGY LUBRICANTS, COMPOSITIONS, AND METHODS FOR USING THE SAME

This application is related to copending U.S. patent application Ser. No. 10/280,409, filed Oct. 25, 2002, the contents of which is hereby incorporated by reference in its entirety.

FIELD OF THE INVENTION

This invention relates to metallurgical powder compositions and methods for using the same. More particularly, the invention relates to metallurgical powder compositions that include an improved lubricant for enhancing lubricity while reducing stripping and sliding pressures.

BACKGROUND

The powder metallurgy industry has developed metal-based powder compositions, generally iron-based powders that can be processed into integral metal parts having different shapes and sizes for uses in various industries, including the automotive and electronics industries. One processing technique for fabricating parts made from metal-based powder composition involves charging a die cavity with a metal-based powder composition and compacting the metal-based powder composition under high pressure to form a "green" compact. The green compact is then removed from the die cavity and sintered to form the finished part.

Metallurgical powder compositions are traditionally provided with a lubricant to reduce internal friction between particles during compaction, to permit easier ejection of the compact from the die cavity, to reduce die wear, and/or to allow more uniform compaction of the metallurgical powder composition. The internal friction forces that must be overcome to remove a compacted part from the die are measured as "stripping" and "sliding" pressures. Internal friction forces increase as the pressure of compaction increases.

Lubricants are classified as internal (dry) lubricants or external (spray) lubricants. Internal lubricants are admixed with a metal-based powder prior to adding the metal-based powder to a die. External lubricants are sprayed onto the interior walls of a die cavity prior to adding the metallurgical powder composition to the die.

Conventional internal lubricants often reduce the green strength of a green compact. It is believed that during compaction the internal lubricant is exuded between iron and/or alloying metal particles such that it fills the pore volume between the particles and interferes with particle-to-particle bonding. As a result some shapes cannot be pressed using known internal lubricants. Tall, thin-walled bushings, for example, require large amounts of internal lubricant to overcome die wall friction and reduce the required ejection force. Such levels of internal lubricant, however, typically reduce green strength to the point that the resulting compacts crumble upon ejection. Also, internal lubricants such as zinc stearate often adversely affect powder flow rate and apparent density, as well as green density of the compact, particularly at higher compaction pressures. Moreover, excessive amounts of internal lubricants can lead to compacts having poor dimensional integrity, and volatized lubricant can form soot on the heating elements of the sintering furnace.

To avoid the problems caused by internal lubricants described above, it is known to use an external spray lubricant rather than an internal lubricant. However, the use of external lubricants increases the compaction cycle time and leads to less uniform compaction. An example of an external lubricant is set forth in U.S. Pat. No. 5,518,639 issued to Luk, assigned to Hoeganaes Corporation.

Accordingly, there exists a need in the art for metallurgical powder compositions that can be used to fabricate strong green compacts that are easily ejected from die cavities without the need for an external lubricant. Prior solutions to this problem are described in U.S. Pat. Nos. 5,498,276, 5,290,336, 5,154,881, and 5,256,185 issued to Luk, assigned to Hoeganaes Corporation. The U.S. Pat. No. 5,498,276 patent discloses use of a polyether as lubricant for the metallurgical powder composition that provides improved strength and ejection performance of the green compact while maintaining equivalent or superior compressibility relative to the use of other lubricants. The U.S. Pat. No. 5,290,336 patent discloses use of a binder/lubricant comprising a dibasic organic acid and one or more additional polar components that provides enhanced physical properties to the powder composition such as apparent density, flow, compressibility, and green strength. The U.S. Pat. No. 5,154,881 patent discloses use of an amide lubricant that is admixed with iron-based powders that permits compaction of the powder composition at higher temperatures without significant die wear and improves green strength and density. Thus, the powder metallurgy industry is in search of lubricants that address these needs.

SUMMARY

The metallurgical powder compositions of the present invention contain metal-based powders and solid lubricants. In one embodiment, metallurgical powder compositions are composed of discrete particles of a metal-based powder admixed with discrete particles of a solid lubricant. In another embodiment, the metallurgical composition is composed of a metal-based powder coated with a solid lubricant. The metallurgical composition can also include common additions such as binders and other internal lubricants.

The solid lubricants of the present invention contain functionalized polyalkylene glycol lubricants or, alternatively, a combination of functionalized polyalkylene glycol lubricants and at least one additional lubricant. Functionalized polyalkylene glycol lubricants have the formula:

$Q_1\text{-}(R_1)_x$, (a), $Q_1\text{-}(R_1\text{-}Q_2)_n\text{-}R_2$ (b), $Q_1\text{-}(R_1\text{-}Q_2)_n\text{-}R_2\text{-}Q_3$ (c), $R_1\text{-}Q_1\text{-}(R_2\text{-}Q_2)_n\text{-}R_3$ (d), or combinations thereof. $Q_1$, $Q_2$, and $Q_3$ can be the same or different from one another and are each independently a linear or branched polyalkylene glycol. $R_1$, $R_2$ and $R_3$ are each independently a functional group. Functional groups include a phosphate group, phosphite group, hypophosphate, hypophosphite, polyphosphate, thiophosphate, dithiophosphate, thiocarbamate, dithiocarbamate, borate, thiosulfate, sulfate group, or sulfonate group. "n" is from 0 to about 10, and "x" is from about 1 to about 30. In some embodiments functionalized polyalkylene glycol lubricants are admixtures of compounds having the formulas (a), (b), and (c). The functional groups can be in their acidic form or neutralized.

The additional lubricants that can be used as part of the solid lubricant include polyamides, $C_{10}$ to $C_{25}$ fatty acids, metal salts of $C_{10}$ to $C_{25}$ fatty acids, metal salts of polyamides, linear or branched non functionalized polyalkanes, alcohols, or a combination thereof. The additional lubricants have a melting range beginning at a temperature of at least about 30 degrees Centigrade.

In one embodiment the solid lubricant is composed of discrete particles of functionalized polyalkylene glycol lubricant and at least one additional lubricant. In another embodiment, the solid lubricant is a melt blend of both functionalized polyalkylene glycol lubricants and at least one additional lubricant thereby forming a homogeneous combination thereof.

The present invention also includes methods for preparing metallurgical powder compositions. In one embodiment, the metallurgical powder compositions can be prepared by admixing discrete particles of solid lubricant and discrete particles of metal-based powder. In another embodiment, the metal-based powder is coated with the solid lubricant.

The present invention also includes methods of making metal parts. Metal parts are prepared by providing a metallurgical powder composition, and compressing the metallurgical powder composition at a pressure of at least about 5 tsi to form a metal part.

DETAILED DESCRIPTION

The present invention relates to metallurgical powder compositions, methods for the preparation of those compositions, methods for using those compositions to make compacted parts, methods for making solid lubricants for use in metallurgical powder compositions, and the solid lubricants themselves. The metallurgical powder compositions of the present invention include a metal-based powder and a solid lubricant. In one embodiment, the metallurgical composition is composed of discrete particles of the metal-based powder that is admixed with discrete particles of a solid lubricant. In another embodiment, the metallurgical composition is composed of metal-based powders that are coated with the solid lubricant.

The solid lubricants contain functionalized polyalkylene glycol lubricants or a combination of functionalized polyalkylene glycol lubricants and at least one additional lubricant. The solid lubricant includes functionalized polyalkylene glycol lubricants that have a phosphate group, a phosphite group, a sulfate group, a sulfonate group, phosphite group, hypophosphate group, hypophosphite group, polyphosphate group, thiophosphate group, dithiophosphate group, thiocarbamate group, dithiocarbamate group, borate group, thiosulfate group, or combinations thereof.

The metallurgical powder compositions are used to fabricate compacted components that are easily removed from a compaction die as shown by the stripping and sliding pressures associated with removing the component from the die. Strip pressure measures the static friction that must be overcome to initiate ejection of a compacted part from a die. Slide pressure is a measure of the kinetic friction that must be overcome to continue the ejection of the part from the die cavity.

Green properties, such as green density, green strength, green expansion, are also improved by using the solid lubricants. The solid lubricants increase green densities and sintered densities of compacted parts while maintaining equivalent or superior compressibility as compared to conventional lubricants.

The metallurgical powder compositions of the present invention include metal-based powders of the kind generally used in the powder metallurgy industry, such as iron-based powders and nickel-based powders. Examples of "iron-based" powders, as that term is used herein, are powders of substantially pure iron, powders of iron pre-alloyed with other elements (for example, steel-producing elements) that enhance the strength, hardenability, electromagnetic properties, or other desirable properties of the final product, and powders of iron to which such other elements have been diffusion bonded.

Substantially pure iron powders that are used in the invention are powders of iron containing not more than about 1.0% by weight, preferably no more than about 0.5% by weight, of normal impurities. Examples of such highly compressible, metallurgical-grade iron powders are the ANCORSTEEL 1000 series of pure iron powders, e.g. 1000, 1000B, and 1000C, available from Hoeganaes Corporation, Riverton, N.J. For example, ANCORSTEEL 1000 iron powder, has a typical screen profile of about 22% by weight of the particles below a No. 325 sieve (U.S. series) and about 10% by weight of the particles larger than a No. 100 sieve with the remainder between these two sizes (trace amounts larger than No. 60 sieve). The ANCORSTEEL 1000 powder has an apparent density of from about 2.85–3.00 g/cm$^3$, typically 2.94 g/cm$^3$. Other iron powders that are used in the invention are typical sponge iron powders, such as Hoeganaes' ANCOR MH-100 powder.

The iron-based powder can optionally incorporate one or more alloying elements that enhance the mechanical or other properties of the final metal part. Such iron-based powders are powders of iron, preferably substantially pure iron, that has been pre-alloyed with one or more such elements. The pre-alloyed powders are prepared by making a melt of iron and the desired alloying elements, and then atomizing the melt, whereby the atomized droplets form the powder upon solidification.

Examples of alloying elements that are pre-alloyed with the iron powder include, but are not limited to, molybdenum, manganese, magnesium, chromium, silicon, copper, nickel, gold, vanadium, columbium (niobium), graphite, phosphorus, aluminum, and combinations thereof. The amount of the alloying element or elements incorporated depends upon the properties desired in the final metal part. Pre-alloyed iron powders that incorporate such alloying elements are available from Hoeganaes Corp. as part of its ANCORSTEEL line of powders.

A further example of iron-based powders are diffusion-bonded iron-based powders which are particles of substantially pure iron that have a layer or coating of one or more other metals, such as steel-producing elements, diffused into their outer surfaces. Such commercially available powders include DISTALOY 4600A diffusion bonded powder from Hoeganaes Corporation, which contains about 1.8% nickel, about 0.55% molybdenum, and about 1.6% copper, and DISTALOY 4800A diffusion bonded powder from Hoeganaes Corporation, which contains about 4.05% nickel, about 0.55% molybdenum, and about 1.6% copper.

A preferred iron-based powder is of iron pre-alloyed with molybdenum (Mo). The powder is produced by atomizing a melt of substantially pure iron containing from about 0.5 to about 2.5 weight percent Mo. An example of such a powder is Hoeganaes' ANCORSTEEL 85HP steel powder, which contains about 0.85 weight percent Mo, less than about 0.4 weight percent, in total, of such other materials as manganese, chromium, silicon, copper, nickel, or aluminum, and less than about 0.02 weight percent carbon. Another example of such a powder is Hoeganaes' ANCORSTEEL 4600V steel powder, which contains about 0.5–0.6 weight percent molybdenum, about 1.5–2.0 weight percent nickel, and about 0.1–25 weight percent manganese, and less than about 0.02 weight percent carbon.

Another pre-alloyed iron-based powder that is used in the invention is disclosed in U.S. Pat. No. 5,108,493, entitled "Steel Powder Admixture Having Distinct Pre-alloyed Powder of Iron Alloys," which is herein incorporated in its entirety. This steel powder composition is an admixture of two different pre-alloyed iron-based powders, one being a pre-alloy of iron with 0.5–2.5 weight percent molybdenum, the other being a pre-alloy of iron with carbon and with at least about 25 weight percent of a transition element component, wherein this component comprises at least one element selected from the group consisting of chromium, manganese, vanadium, and columbium. The admixture is in proportions that provide at least about 0.05 weight percent of the transition element component to the steel powder composition. An example of such a powder is commercially available as Hoeganaes' ANCORSTEEL 41 AB steel powder, which contains about 0.85 weight percent molybdenum, about 1 weight percent nickel, about 0.9 weight percent manganese, about 0.75 weight percent chromium, and about 0.5 weight percent carbon.

Other iron-based powders that are useful in the practice of the invention are ferromagnetic powders. An example is a powder of iron pre-alloyed with small amounts of phosphorus.

The iron-based powders that are useful in the practice of the invention also include stainless steel powders. These stainless steel powders are commercially available in various grades in the Hoeganaes ANCOR® series, such as the ANCOR® 303L, 304L, 316L, 410L, 430L, 434L, and 409Cb powders.

The particles of iron or pre-alloyed iron have a weight average particle size as small as one micron or below, or up to about 850–1,000 microns, but generally the particles will have a weight average particle size in the range of about 10–500 microns. Preferred are iron or pre-alloyed iron particles having a maximum weight average particle size up to about 350 microns; more preferably the particles will have a weight average particle size in the range of about 25–150 microns, and most preferably 80–150 microns.

The metal-based powders used in the present invention can also include nickel-based powders. Examples of "nickel-based" powders, as that term is used herein, are powders of substantially pure nickel, and powders of nickel pre-alloyed with other elements that enhance the strength, hardenability, electromagnetic properties, or other desirable properties of the final product. The nickel-based powders can be admixed with any of the alloying powders mentioned previously with respect to the iron-based powders including iron. Examples of nickel-based powders include those commercially available as the Hoeganaes ANCORSPRAY® powders such as the N-70/30 Cu, N-80/20, and N-20 powders.

The metallurgical powder compositions of the present invention can also include a minor amount of an alloying powder. As used herein, "alloying powders" refers to materials that are capable of alloying with the iron-based or nickel-based materials upon sintering. The alloying powders that can be admixed with metal-based powders of the kind described above are those known in the metallurgical arts to enhance the strength, hardenability, electromagnetic properties, or other desirable properties of the final sintered product. Steel-producing elements are among the best known of these materials.

Specific examples of alloying materials include, but are not limited to, elemental molybdenum, manganese, chromium, silicon, copper, nickel, tin, vanadium, columbium (niobium), metallurgical carbon (graphite), phosphorus, aluminum, sulfur, and combinations thereof. Other suitable alloying materials are binary alloys of copper with tin or phosphorus; ferro-alloys of manganese, chromium, boron, phosphorus, or silicon; low-melting ternary and quaternary eutectics of carbon and two or three of iron, vanadium, manganese, chromium, and molybdenum; carbides of tungsten or silicon; silicon nitride; and sulfides of manganese or molybdenum.

The alloying powders are in the form of particles that are generally of finer size than the particles of metal-based powder with which they are admixed. The alloying particles generally have a weight average particle size below about 100 microns, preferably below about 75 microns, more preferably below about 30 microns, and most preferably in the range of about 5–20 microns. The amount of alloying powder present in the composition will depend on the properties desired of the final sintered part. Generally the amount will be minor, up to about 5% by weight of the total powder composition weight, although as much as 10–15% by weight can be present for certain specialized powders. A preferred range suitable for most applications is about 0.25–4.0% by weight.

The metal-based powders generally constitute at least about 80 weight percent, preferably at least about 85 weight percent, and more preferably at least about 90 weight percent of the metallurgical powder composition.

The solid lubricant is composed of one or more functionalized polyalkylene glycol lubricants or, alternatively, a combination of one or more functionalized polyalkylene glycol lubricants and at least one additional lubricant.

"Polyalkylene glycol" means linear or branched compounds having the general formula:

      (I),

      (II),

      (III), or

      (IV), wherein X is from about 1 to about 10, and Y is from about 5 to about 2000. R is a conventional branching group known to those skilled in the art. For example, R is H, a methyl group, an ethyl group, a propyl group, a butyl group, or a pentyl group. Polyalkylene glycols include, for example, polymethylene glycol, polyethylene glycol, polypropylene glycol, polybutylene glycol, polypentylene glycol, etc., and mixtures thereof. The polymer may be saturated or unsaturated. Polyalkylene glycols include homopolymers and copolymers of compounds having the general formula I, II, III, or IV. Copolymers of polyalkylene glycol are composed of conventional comonomers known to those skilled in the art. For example, polyalkylene glycols include copolymers composed of polyethylene glycol monomer and polymethylene glycol monomer.

"Functionalized polyalkylene glycol" means a polyalkylene glycol having one or more functional groups capable of taking part in a reaction. For example, functionalized poly alkylene glycol lubricants include compounds having the formula:

$Q_1\text{-}(R_1)_x$, (a), $Q_1\text{-}(R_1\text{-}Q_2)_n\text{-}R_2$ (b), $Q_1\text{-}(R_1\text{-}Q_2)_n\text{-}R_2\text{-}Q_3$ (c), $R_1\text{-}Q_1\text{-}(R_2\text{-}Q_2)_n\text{-}R_3$ (d), or combinations thereof. $Q_1$, $Q_2$, and $Q_3$ can be the same or different from one another and are each independently a linear or branched polyalkylene glycol. $R_1$, $R_2$ and $R_3$ are each independently a functional group. Functional groups include a phosphate group, phosphite group, hypophosphate, hypophosphite, polyphosphate, thiophosphate, dithiophosphate, thiocarbamate, dithiocarbamate, borate, thiosulfate, sulfate group, or sulfonate group. "n" is from 0 to about 10, and "x" is from about 1 to about 30. The functional groups can be in their acidic or neutralized form.

The polyalkylene glycol has a molecular weight from about 200 to about 100,000, more preferably from about 400 to about 30,000, and still more preferably from about 1,000 to about 20,000, still more preferably from about 1,000 to about 10,000, still more preferably from about 3,000 to about 10,000, and still more preferably the molecular weight is about 6000. Preferably, the polyalkylene glycol is polyethylene glycol or polypropylene glycol. More preferably $Q_1$, $Q_2$, and $Q_3$ are each independently a polyethylene glycol.

Functionalized polyalkylene glycol lubricants are prepared by reacting from about 90% to about 99% by weight of a polyalkylene glycol with from about 10% to about 1% by weight of a reactant capable of attaching an $R_1$, $R_2$ and $R_3$ functional group to a polyalkylene glycol. Preferably, functionalized polyalkylene glycol lubricants are prepared by reacting from about 95% to about 98.5% by weight of a polyalkylene glycol with from about 1.5% to about 5% by weight of a reactant capable of attaching an $R_1$, $R_2$ and $R_3$ functional group to polyalkylene glycol.

In one embodiment the reactant capable of attaching an $R_1$, $R_2$ and $R_3$ functional group to a polyalkylene glycol is a phosphoric acid or a derivative thereof. Derivatives of phosphoric acid include those compounds known to those skilled in the art. Derivatives of phosphoric acid include, for example, phosphorus oxychloride and phosphorus pentoxide. Preferably the polyalkylene alcohol is reacted with phosphoric acid or phosphorus pentoxide. More preferably the polyalkylene is reacted with phosphorus pentoxide.

The polyalkylene glycol and reactant capable of attaching an $R_1$, $R_2$ and $R_3$ functional group to a polyalkylene glycol are reacted for from about 0.5 to about 15 hours. Preferably, the polyalkylene glycol and reactant capable of attaching an $R_1$, $R_2$ and $R_3$ functional group to a polyalkylene glycol are reacted from about 1 to about 6 hours, more preferably for from about 1.5 to about 5 hours, still more preferably from about 2.5 to about 3.5 hours, and still more preferably for about 2 hours.

The polyalkylene glycol and reactant capable of attaching an $R_1$, $R_2$ and $R_3$ functional group to a polyalkylene glycol are reacted at from about 65 to about 130 degrees Centigrade. Preferably, the polyalkylene glycol and reactant capable of attaching an $R_1$, $R_2$ and $R_3$ functional group to a polyalkylene glycol are reacted at from about 70 to about 100 degrees Centigrade, more preferably from about 70 to about 85 degrees Centigrade.

The reaction product consists of functionalized polyalkylene glycol, high molecular weight oligomers wherein several polyalkylene glycol units are connected by functional groups, and unreacted polyalkylene glycol. After the reaction, the reaction product is filtered and cooled to room temperature. After cooling, the reaction product is atomized.

The functionalized polyalkylene glycol lubricant has a melting temperature of from about 55 to about 80 degrees Centigrade. Preferably the melting temperature range is from about 55 to about 70 degrees Centigrade, and even more preferably from about 60 to about 65 degrees Centigrade.

In one embodiment, functionalized polyalkylene glycol lubricants are prepared by reacting from about 90% to about 99% by weight of a polyethylene glycol with from about 10% to about 1% by weight of phosphorus pentoxide. The polyalkylene glycol and phosphorus pentoxide are reacted for from about 2 to about 4 hours at from about 70 to about 100 degrees Centigrade. The reaction product consists of polyethylene glycol phosphate, di(polyethylene glycol) phosphate, polyethylene glycol diphosphate, high molecular weight oligomers having several polyalkylene glycol units connected by phosphate groups, and unreacted polyethylene glycol.

In another embodiment, functionalized polyalkylene glycol lubricants are prepared by reacting from about 97% to about 98% by weight of a polyethylene glycol, PEG6000PF, obtained Clariant with from with from about 3% to about 2% by weight of phosphorus pentoxide. The polyalkylene glycol and phosphorus pentoxide are reacted for from about 2 to about 4 hours at from about 70 to about 85 degrees Centigrade.

In one embodiment, solid lubricants include a combination of functionalized polyalkylene glycol lubricants and at least one additional lubricant. Additional lubricants are conventional internal lubricants including, for example, esters of montanic acids having multifunctional alcohols. Ester of montanic acids include for example Licowax E® available from Clarient Corporation. Examples of such additional lubricants include stearate compounds, such as lithium, zinc, manganese, and calcium stearates commercially available from Witco Corp., and polyolefins commercially available from Shamrock Technologies, Inc.; mixtures of zinc and lithium stearates commercially available from Alcan Powders & Pigments as Ferrolube M, and mixtures of ethylene bis-stearamides with metal stearates such as Witco ZB-90. Other conventional lubricants that can be used as part of the solid lubricant include ACRAWAX (available from Lonza Corporation) and KENOLUBE (available from Höganäs AG of Sweden).

Preferably, the additional lubricants are amines, amides or polyamides, metal salts of the polyamides, $C_{10}$ to $C_{25}$ fatty acids, or fatty alcohols, metal salts of the fatty acids, or combinations thereof. Preferably, the polyamide additional lubricants have a melting range that begins at a temperature of at least about 70° C. More preferably, the polyamide additional lubricant is ethylene bis-stearamide that is commercially available as ACRAWAX from Lonza Corporation.

The $C_{10}$ to $C_{25}$ fatty acid additional lubricants are a saturated or unsaturated aliphatic monocarboxylic acid. Preferably, the monocarboxylic acid is a $C_{12}$–$C_{20}$ saturated acid. The most preferred saturated monocarboxylic acid is stearic acid. The most preferred unsaturated monocarboxylic acid is oleic acid. Alternatively, a metal salt of the $C_{10}$ to $C_{25}$ fatty acid additional lubricant may be employed in place of the $C_{10}$ to $C_{25}$, fatty acid.

The beneficial improvements in green properties resulting from the use of functionalized polyalkylene glycol lubricants are generally proportional to the amount of the functionalized polyalkylene glycol lubricants relative to any other internal lubricants. Thus, it is preferred that the functionalized polyalkylene glycol lubricants generally constitute at least about 10%, preferably at least about 30%, more preferably at least about 50%, and even more preferably at least about 75%, by weight of the solid internal lubricant present in the metallurgical powder composition. In some embodiments, the functionalized polyalkylene glycol lubricant comprises the entire solid lubricant.

The present invention also relates to methods of making the solid lubricants. In one embodiment, the solid lubricant includes a combination of discrete dry particles of the functionalized polyalkylene glycol lubricants and discrete dry particles of at least one additional lubricant. The solid lubricant is made using conventional wet or dry mixing techniques.

The weight average particle size of the discrete solid lubricant particles is preferably between about 2 and 200 microns, more preferably between about 5 and about 150 microns, and even more preferably between about 10 and 110 microns. Preferably about 90% by weight of the functionalized polyalkylene glycol lubricant particles are below about 200 microns, preferably below about 175 microns, and more preferably below about 150 microns. Preferably, at least 90% by weight of the functionalized polyalkylene glycol lubricant particles are above about 3 microns, preferably above about 5 microns, and more preferably above about 10 microns. Particle size is measured by conventional laser diffraction methods.

In another embodiment, the functionalized polyalkylene glycol lubricants are produced in the final form of particles that are a homogenous combination of functionalized polyalkylene glycol lubricant and at least one additional lubricant. The solid lubricant is made by traditional melt blending techniques.

The solid lubricant is blended into the metallurgical powder generally in an amount of from about 0.01 to about 20 weight percent, based on the weight of the metallurgical powder composition. Preferably, the solid lubricant constitutes about 0.1 to about 5 weight percent, more preferably from about 0.1 to about 2 weight percent, and even more preferably about 0.1–0.8 weight percent, based on the total weight of the metallurgical powder composition.

A binding agent can optionally be incorporated into the metallurgical powder compositions. The binding agent is useful to prevent segregation and/or dusting of the alloying powders or any other special-purpose additives commonly used with iron or steel powders. The binding agent therefore enhances the compositional uniformity and alloying homogeneity of the final sintered metal parts.

The binding agents that are used in the present method are those commonly employed in the powder metallurgical arts. Examples include those illustrated in U.S. Pat. Nos. 4,483,905 and 4,834,800, which are incorporated herein by reference. Such binders include polyglycols such as polyethylene glycol or polypropylene glycol, glycerine, polyvinyl alcohol, homopolymers or copolymers of vinyl acetate; cellulosic ester or ether resins, methacrylate polymers or copolymers, alkyd resins, polyurethane resins, polyester resins, and combinations thereof. Other examples of binding agents which are applicable are the high molecular weight polyalkylene oxides. The binding agent can be added to the metal-based powder according to the procedures taught by U.S. Pat. Nos. 4,483,905 and 4,834,800, which are herein incorporated by reference in their entirety.

Generally, the binding agent is added in a liquid form and mixed with the powders until good wetting of the powders is attained. Those binding agents that are in liquid form at ambient conditions can be added to the metal-based powder as such, but it is preferred that the binder, whether liquid or solid, be dissolved or dispersed in an organic solvent and added as this liquid solution, thereby providing substantially homogeneous distribution of the binder throughout the mixture.

The amount of binding agent to be added to the metal-based powder depends on such factors as the density and particle size distribution of the alloying powder, and the relative weight of the alloying powder in the composition, as discussed in U.S. Pat. No. 4,834,800 and in co-pending application Ser. No. 848,264 filed Mar. 9, 1992. Generally, the binder will be added to the metal-based powder in an amount of about 0.001–1% by weight, based on the total weight of the metallurgical powder composition. Preferably, from about 0.01 weight percent to about 0.5 weight percent, more preferably from about 0.05 weight percent to about 0.5 eight percent to the metal-based powder.

The present invention also relates to methods of preparing metallurgical powder compositions. In one embodiment, metallurgical powder compositions are prepared by first admixing a metal-based powder, a solid lubricant, an optional alloying powder, and an optional binder using conventional blending techniques. This admixture is formed by conventional solid particle blending techniques to form a substantially homogeneous particle blend. In other embodiments, metallurgical powder compositions are prepared by first providing a metal-based powder, and then coating the powder with a solid lubricant. Metal based powders are coated with functionalized polyalkylene glycol lubricants by conventional techniques known to those skilled in the art, including for example solvent bonding techniques.

The present invention also relates to methods of fabricating metal parts that are compacted in a die according to conventional metallurgical techniques. Metal parts are prepared by providing a metallurgical powder composition, and compressing the metallurgical powder composition at a pressure of at least about 5 tsi to form a metal part.

In one embodiment, the compaction pressure is about 5–100 tons per square inch (69–1379 MPa), preferably about 20–100 tsi (276–1379 MPa), and more preferably about 25–70 tsi (345–966 MPa).

In another embodiment, it has been found that the use of functionalized polyalkylene glycol lubricants provides enhanced compaction densities at compaction pressures above about 50 tsi. Preferably, it has been found that compaction pressures greater than about 60 tsi, more preferably from about 60 tsi to about 120 tsi, and still more preferably even up to about 200 tsi, provides enhanced compaction densities. Compaction techniques used to achieve compaction pressures above 50 tsi include conventional hydraulic and mechanical pressing techniques, but also include explosive, direct powder compaction, and high velocity compaction techniques. After compaction, the part may be sintered according to conventional metallurgical techniques. In another embodiments, after compaction, the part is not sintered, but is finished according to conventional metallurgical techniques.

EXAMPLES

The following examples, which are not intended to be limiting, present certain embodiments and advantages of the present invention. Unless otherwise indicated, any percentages are on a weight basis.

Tests were conducted to compare the solid lubricants to conventional wax lubricants. Different metallurgical powder compositions were prepared and compared to a reference metallurgical powder composition containing a conventional lubricant. The metallurgical powder compositions included a solid lubricant that was substantially composed of a functionalized polyalkylene glycol lubricant.

The functionalized polyalkylene glycol lubricants were prepared by reacting 100 grams of a polyethylene glycol, PEG6000OPF, obtained from Clariant, with 2.3 grams of phosphorus pentoxide in a laboratory glass reactor. First, polyethylene glycol was added to the reactor and heated to about 75 degrees. Then, the phosphorus pentoxide was incrementally added over 1 hour. The reaction mixture was then maintained at a temperature of from about 70 to about 80 degrees Centigrade for about 2 hours while the reactants were stirred. The functionalized polyalkylene glycol lubricant was removed from the reactor and cooled.

The functionalized polyalkylene glycol lubricants consisted of polyethylene glycol phosphate, di(polyethylene glycol)phosphate, polyethylene glycol diphosphate, high molecular weight oligomers having several polyalkylene glycol units connected by phosphate groups, and unreacted polyethylene glycol. The functionalized polyethylene glycol lubricant was admixed with the metal powder composition prior to admixing the additional lubricant.

Where stated below, solvent bonding techniques were used to mix metal powders and solid lubricants. The functionalized polyethylene glycol lubricant was solvent bonded to the metal powder composition prior to admixing an additional lubricant. Conventional solvent bonding techniques were utilized. For example, the solid lubricants were first dissolved in a solvent. Then the metal powders were sprayed or submerged in the solvent/lubricant solution. Lastly, the solvent was removed thereby depositing the lubricant on the surface of the metal powder particles.

The metallurgical powder compositions were admixed in standard laboratory bottle-mixing equipment for about 20–30 minutes. The metallurgical powder compositions were then compacted into green bars in a die at 50 or 60 TSI pressure. In some experiments the green bars were then sintering in a dissociated ammonia atmosphere for about 30 minutes at temperatures of about 1120° C. (2050° F.).

Physical properties of the metallurgical powder compositions and of the green and sintered bars were determined generally in accordance with the following test methods and formulas:

| Property | Test Method |
| --- | --- |
| Apparent Density (g/cc) | ASTM B212-76 |
| Dimensional change (%) | ASTM B610-76 |
| Flow (sec/50 g) | ASTM B213-77 |
| Green Density (g/cc) | ASTM B331-76 |
| Green Strength (psi) | ASTM B312-76 |
| Hardness ($R_B$) | ASTM E18-84 |
| Sintered Density (g/cc) | ASTM B331-76 |

Green Expansion G.E. (%) = $\frac{100[(\text{green bar length}) - (\text{die length})]}{\text{die length}}$ In addition the stripping and sliding pressure were measured for each green bar. Strip pressure measures the static friction that must be overcome to initiate ejection of a compacted part from a die. It was calculated as the quotient of the load needed to start the ejection over the cross-sectional area of the part that is in contact with the die surface, and is reported in units of psi.

Slide pressure is a measure of the kinetic friction that must be overcome to continue the ejection of the part from the die cavity; it is calculated as the quotient of the average load observed as the part traverses the distance from the point of compaction to the mouth of the die, divided by the surface area of the part that is in contact with the die surface, and is reported in units of psi.

Stripping and sliding pressures were recorded during ejection of the green bar as follows. After the compaction step, one of the die punches was removed from the die, and pressure was placed on the second die punch in order to push the green bar from the die. The load necessary to initiate movement of the part was recorded. Once the green bar began to move, the bar was pushed from the die at a rate of 0.10 cm (0.04 in.) per second. The stripping pressure was the pressure for the process at the point where movement was initiated. The sliding pressure was the pressure observed as the part traverses the distance from the point of compaction to the mouth of the die.

Example 1

The first reference composition, Reference Composition A contained 96.9% wt. Hoeganaes ANCORSTEEL 85HP steel powder, 2.0% wt. nickel powder (INCO123, Inco), and 0.6% wt. graphite powder (grade 3203HS, Ashbury Graphite Mill), and 0.3% wt. of a conventional lubricant, (polyethylene glycol; PEG6000PF from Clarient), and 0.2% wt. of an additional lubricant, (Acrawax C from Lonza). The first test composition, Composition A, was the same as Reference Composition A, except that the conventional lubricant was replaced with 0.3% wt. of solid lubricant composed of a functionalized polyethylene glycol lubricant.

The powder properties for the compositions are shown in Table 1:

TABLE 1

| POWDER PROPERTIES | Reference Comp. A | Composition A |
| --- | --- | --- |
| Apparent Density (g/cc) | 3.13 | 3.11 |
| Flow (sec/50 g) | 26.7 | 29.2 |

Test results show that the flowability of Composition A was lower than the flowability of Reference Composition A. The apparent density of Composition A was similar to the apparent density of the Reference Composition A.

The powder compositions were pressed into bars at 60 tsi and 145 degrees Fahrenheit. The compaction properties of the green bars are shown in Table 2:

TABLE 2

| GREEN PROPERTIES | Reference Comp. A | Composition A |
| --- | --- | --- |
| GREEN DENSITY | 7.40 | 7.40 |
| GREEN STRENGTH | 5796 | 5588 |
| GREEN EXPANSION | 0.18 | 0.14 |
| STRIPPING PRESSURE | 4684 | 4109 |
| SLIDING PRESSURE | 2717 | 2345 |

The stripping and sliding pressures for the bars made from Composition A were lower than the stripping and sliding pressures for the bars made from Reference Composition A. The green expansion of the bars made from the Composition A was lower than the green expansion of the bars made from Reference Composition A. The green strength and green densities of the bars made from Composition A were similar to the green strength and green densities of the bars made from Reference Composition A.

The sinter properties for the compositions are shown in Table 3:

TABLE 3

| SINTER PROPERTIES | Reference Comp. A | Composition A |
|---|---|---|
| Sinter Density (g/cc) | 7.43 | 7.43 |
| TRS Strength | 243,541 | 235,465 |
| Hardness (Rockwell B) | 95.7 | 95.5 |

The sinter density and hardness of the bars made from Composition A were similar to the sinter density hardness of the bars made from Reference Composition A.

Thus, the incorporation of the functionalized polyalkylene glycol lubricant results in metal powder compositions that have lower green expansions that can be compacted into parts that are also easier to remove from the die as shown by the lower ejection forces required to remove the green bars from a die.

Example 2

Tests were conducted with metallurgical powder compositions that had different solid lubricant compositions than used in Example 1. The second test composition, Composition B, was the same as Composition A, except that the additional lubricant was replaced with 0.2% wt. of a different additional lubricant (Kenolube from Höganäs AG of Sweden). The functionalized polyethylene glycol lubricant was solvent bonded to the metal powder composition prior to admixing the additional lubricant. The second reference composition, Reference Composition B, was the same as Composition B, except that the functionalized polyalkylene glycol lubricant was replaced with 0.3% wt. of a conventional lubricant, (polyethylene glycol; PEG6000PF from Clarient).

The powder properties for the compositions are shown in Table 4:

TABLE 4

| POWDER PROPERTIES | Reference Comp. B | Composition B |
|---|---|---|
| Apparent Density (g/cc) | 3.18 | 3.13 |
| Flow (sec/50 g) | 24.3 | 26.1 |

Test results show that the flowability and apparent density of Composition B were lower than the flowability and apparent density of the Reference Composition.

The powder compositions were pressed into bars at 60 tons per square inch (tsi) and 145 degrees Fahrenheit. The compaction properties of the green bars are shown in Table 5:

TABLE 5

| GREEN PROPERTIES | Reference Comp. B | Composition B |
|---|---|---|
| GREEN DENSITY | 7.39 | 7.39 |
| GREEN STRENGTH | 4831 | 4998 |
| GREEN EXPANSION | 0.18 | 0.15 |
| STRIPPING PRESSURE | 4305 | 4060 |
| SLIDING PRESSURE | 2441 | 2365 |

The stripping and sliding pressures of the bars made from Composition B were lower than the bars made from Reference Composition B. The green strength of the bars made from Composition B was higher than the green strength of the bars made from the Reference Composition. The green expansion of the bars made from the Composition B was lower than the green expansion of the bars made from Reference Composition B. The green density of the bars made from Composition B was similar to the green density of the bars made from Reference Composition B.

The bars were then sintered. The sinter properties for the compositions are shown in Table 6:

TABLE 6

| SINTER PROPERTIES | Reference Comp. B | Composition B |
|---|---|---|
| Sinter Density (g/cc) | 7.42 | 7.43 |
| TRS Strength | 235,236 | 240,133 |
| Hardness (Rockwell B) | 95.2 | 95.6 |

The sinter density of the bars made from Composition B was slightly higher than the sinter density of the bars made from Reference Composition B. The bars made from Composition B also had a higher transverse rupture strength and hardness compared to the bars made from Reference Composition B.

Thus, the incorporation of the functionalized polyalkylene glycol lubricant results in metal powder compositions that have lower green expansions that can be compacted into parts that are also easier to remove from the die as shown by the lower ejection forces required to remove the green bars from a die.

Example 3

Tests were conducted with metallurgical powder compositions that had different solid lubricant compositions than used in Examples 1 & 2. The third test composition, Composition C, was the same as Composition A, except that the additional lubricant was replaced with 0.2% wt. of a different additional lubricant (Licowax E from Clarient). The functionalized polyethylene glycol lubricant was solvent bonded to the metal powder composition prior to admixing the additional lubricant. The third reference composition, Reference Composition C, was the same as Composition C, except that the functionalized polyalkylene glycol lubricant was replaced with 0.3% wt. of a conventional lubricant, (polyethylene glycol; PEG6000PF from Clarient).

The powder properties for the compositions are shown in Table 7:

TABLE 7

| POWDER PROPERTIES | Reference Comp. C | Composition C |
|---|---|---|
| Apparent Density (g/cc) | 3.04 | 3.04 |
| Flow (sec/50 g) | 27.9 | 31.7 |

The flowability of Composition C was lower than the flowability of Reference Composition C. The apparent density of Composition C was similar to the apparent density of Reference Composition C.

The powder compositions were pressed into bars at 60 tsi and 145 degrees Fahrenheit. The compaction properties of the green bars are shown in Table 8:

TABLE 8

| GREEN PROPERTIES | Reference Comp. C | Composition C |
|---|---|---|
| GREEN DENSITY | 7.40 | 7.39 |
| GREEN STRENGTH | 5338 | 5348 |

TABLE 8-continued

| GREEN PROPERTIES | Reference Comp. C | Composition C |
|---|---|---|
| GREEN EXPANSION | 0.19 | 0.16 |
| STRIPPING PRESSURE | 4247 | 3837 |
| SLIDING PRESSURE | 2661 | 2181 |

The stripping and sliding pressures were lower for the bars made from Composition C compared to the bars made from Reference Composition C. The green expansion of the bars made from the Composition C was lower than the green expansion of the bars made from Reference Composition C. The green strength and green density of the bars made from Composition C were similar to the green strength and green density of the bars made from Reference Composition C.

The bars were then sintered. The sinter properties for the compositions are shown in Table 9:

TABLE 9

| SINTER PROPERTIES | Reference Comp. C | Composition C |
|---|---|---|
| Sinter Density (g/cc) | 7.43 | 7.43 |
| TRS Strength | 233,753 | 233,439 |
| Hardness (Rockwell B) | 97.1 | 97.6 |

The sinter density and transverse rupture strength of the bars made from Composition C was similar to the sinter density and transverse rupture strength of the bars made from Reference Composition C.

Thus, the incorporation of the functionalized polyalkylene glycol lubricant results in metal powder compositions that have lower green expansions that can be compacted into parts that are also easier to remove from the die as shown by the lower ejection forces required to remove the green bars from a die.

Example 4

The fourth test composition, Composition D, was the same as Composition A, except that the solid lubricant was replaced with 0.5% wt. of solid lubricant composed of (a) 0.3% wt. of a functionalized polyethylene glycol lubricant, and (b) 0.2% wt. of an additional lubricant, a phosphated stearyl alcohol. The phosphated stearyl alcohol was prepared by reacting 80 weight percent stearyl alcohol with 20 weight percent phosphorus pentoxide for about 2 to about 4 hours at about 75 to about 90 degrees Centigrade according to the methods described in U.S. patent application Ser. No. 10/280,409, filed Oct. 23, 2002. The functionalized polyethylene glycol lubricant was solvent bonded to the metal powder composition prior to admixing the additional lubricant. Reference Composition D was the same as Composition D except the functionalized polyethylene glycol lubricant was replaced with 0.3% wt. of polyethylene glycol (PEG6000PF from Clarient).

The powder properties for the compositions are shown in Table 10:

TABLE 10

| POWDER PROPERTIES | Reference Comp. D | Composition D |
|---|---|---|
| Apparent Density (g/cc) | 3.16 | 3.21 |
| Flow (sec/50 g) | 23.6 | 25.3 |

The apparent density of Composition D was higher than Reference Compositions D.

The powder compositions were pressed into bars at 60 tsi and 145 degrees Fahrenheit. The compaction properties of the green bars are shown in Table 11:

TABLE 11

| GREEN PROPERTIES | Reference Comp. D | Composition D |
|---|---|---|
| GREEN DENSITY | 7.41 | 7.41 |
| GREEN STRENGTH | 3803 | 4842 |
| GREEN EXPANSION | 0.21 | 0.16 |
| STRIPPING PRESSURE | 3596 | 3571 |
| SLIDING PRESSURE | 1854 | 1825 |

The stripping and sliding pressures for the bars made from Composition D were similar to the stripping and sliding pressure for the bars made from Reference Compositions D. The green strength of the bars made from Composition D was higher than the green strength of the bars made from Reference Composition D. The green expansion of the bars made from the Composition D was lower than the green expansion of the bars made from Reference Composition D. The green density of the bars made from Composition D was similar to the green density of the bars made from Reference Composition D.

The bars were then sintered. The sinter properties for the compositions are shown in Table 12:

TABLE 12

| SINTER PROPERTIES | Reference Comp. D | Composition D |
|---|---|---|
| Sinter Density (g/cc) | 7.45 | 7.44 |
| TRS Strength | 241,034 | 232,316 |
| Hardness (Rockwell B) | 97.7 | 97.1 |

The sinter properties of the bars made from Composition D were similar to the sinter properties of the bars made from Reference Composition D.

Thus, the incorporation of the functionalized polyalkylene glycol lubricant results in metal powder compositions that have higher green strengths. Parts made from these compositions are easier to remove from the die as shown by the lower ejection forces required to remove the green bars from a die.

Example 5

The fifth test composition, Composition E, was the same as Composition A, except that the solid lubricant was replaced with 0.4% wt. of solid lubricant composed of a functionalized polyethylene glycol lubricant and 0.1% wt. of an additional lubricant, a phosphated stearyl alcohol. The functionalized polyethylene glycol lubricant was solvent bonded to the metal powder composition prior to admixing the additional lubricant. The fifth reference composition, Reference Composition E, was the same as Composition E, except that the functionalized polyalkylene glycol lubricant was replaced with 0.4% wt. of polyethylene glycol (PEG6000PF from Clarient).

The powder properties for the compositions are shown in Table 13:

TABLE 13

| POWDER PROPERTIES | Reference Comp. E | Composition E |
|---|---|---|
| Apparent Density (g/cc) | 3.03 | 3.06 |
| Flow (sec/50 g) | 25.7 | 27.7 |

The flowability of Composition E was lower than Reference Compositions E. The apparent density of Composition E was higher than Reference Composition E.

The powder compositions were pressed into bars at 60 tsi and 145 degrees Fahrenheit. The compaction properties of the green bars are shown in Table 14:

TABLE 14

| GREEN PROPERTIES | Reference Comp. E | Composition E |
|---|---|---|
| GREEN DENSITY | 7.41 | 7.41 |
| GREEN STRENGTH | 5492 | 6159 |
| GREEN EXPANSION | 0.21 | 0.20 |
| STRIPPING PRESSURE | 4734 | 3933 |
| SLIDING PRESSURE | 2467 | 2205 |

The stripping and sliding pressures for the bars made from Composition E were lower than the stripping and sliding pressure for the bars made from Reference Compositions E. The green strength of the bars made from Composition E was higher than the green strength of the bars made from Reference Composition E. The green expansion of the bars made from the Composition E was lower than the green expansion of the bars made from Reference Composition E. The green density of the bars made from Composition E was similar to the green density of the bars made from Reference Composition E.

The bars were then sintered. The sinter properties for the compositions are shown in Table 15:

TABLE 15

| SINTER PROPERTIES | Reference Comp. E | Composition E |
|---|---|---|
| Sinter Density (g/cc) | 7.46 | 7.47 |
| TRS Strength | 253,728 | 249,217 |
| Hardness (Rockwell B) | 96.2 | 96.8 |

The sinter density and transverse rupture strength of the bars made from Composition E was similar to the sinter density and transverse rupture strength of the bars made from Reference Composition E.

Thus, the incorporation of the functionalized polyalkylene glycol lubricant results in metal powder compositions that have lower green expansions and higher green strengths. Parts made from these compositions are easier to remove from the die as shown by the lower ejection forces required to remove the green bars from a die.

Example 6

The sixth test composition, Composition F, contained 96.8% wt. Hoeganaes ANCORSTEEL 85HP steel powder, 2.0% wt. nickel powder (INCO123, Inco), 0.6% wt. graphite powder (grade 3203HS, Ashbury Graphite Mill), and 0.6% wt. of a solid lubricant composed of a functionalized polyethylene glycol lubricant. The solid lubricant was admixed with the metal powder.

The sixth reference composition, Reference Composition F, was the same as Composition F, except that the solid lubricant was replaced with 0.6% wt. of a conventional lubricant, polyethylene glycol (PEG6000PF from Clarient).

The powder properties for the compositions are shown in Table 16

TABLE 16

| POWDER PROPERTIES | Reference Comp. F | Composition F |
|---|---|---|
| Apparent Density (g/cc) | 2.96 | 3.02 |
| Flow (sec/50 g) | 34.1 | 34.1 |

The flowability of Composition F was similar to the flowability of Reference Composition F. The apparent density of Composition F was greater than the apparent density of the Reference Composition F.

The powder compositions were pressed into bars at 50 tsi and 145 degrees Fahrenheit. The compaction properties of the green bars are shown in Table 17:

TABLE 17

| GREEN PROPERTIES | Reference Comp. F | Composition F |
|---|---|---|
| GREEN DENSITY | 7.33 | 7.36 |
| GREEN STRENGTH | 6507 | 6713 |
| GREEN EXPANSION | 0.13 | 0.14 |
| STRIPPING PRESSURE | 4344 | 3661 |
| SLIDING PRESSURE | 1575 | 1236 |

The stripping and sliding pressures for the bars made from Composition F were less than the stripping and sliding pressures for the bars made from Reference Composition F. The green strength and green densities of the bars made from Composition F were greater than the green strength and green densities of the bars made from Reference Composition F.

The sinter properties for the compositions are shown in Table 18:

TABLE 18

| SINTER PROPERTIES | Reference Comp. F | Composition F |
|---|---|---|
| Sinter Density (g/cc) | 7.33 | 7.36 |
| TRS Strength | 212,898 | 216,479 |
| Hardness (Rockwell B) | 92.3 | 93.4 |

The sinter density, transverse rupture strength, and hardness of the bars made from Composition F were greater than the sinter density, transverse rupture strength, and hardness of the bars made from Reference Composition F.

Thus, the incorporation of the functionalized polyalkylene glycol lubricant results in metal powder compositions that have greater apparent density, green strength, green density, sinter density, strength and hardness compared to the reference composition. The functionalized polyalkylene glycol lubricant are compacted into parts that are also easier to remove from the die as shown by the lower ejection forces required to remove the green bars from a die.

Example 7

The seventh test composition, Test Composition G, was the same as Composition A, except that the solid lubricant was replaced with 0.5% wt. of solid lubricant composed of a functionalized polyethylene glycol lubricant. The solid lubricant was solvent bonded with the metal powder composition. Reference composition G contained 96.65% wt. Hoeganaes ANCORSTEEL 85HP steel powder, 2.0% wt. nickel powder (INCO123, Inco), and 0.6% wt. graphite powder (grade 3203HS, Ashbury Graphite Mill), 0.75% wt. of a conventional lubricant, Acrawax C (Lonza).

The powder properties for the compositions are shown in Table 19:

TABLE 19

| POWDER PROPERTIES | Reference Comp. G | Composition G |
|---|---|---|
| Apparent Density (g/cc) | 3.10 | 3.11 |
| Flow (sec/50 g) | No Flow | 26.6 |

The flowability of Composition E was better than Reference Compositions F.

The powder compositions were pressed into bars at 60 tsi and 145 degrees Fahrenheit. The compaction properties of the green bars are shown in Table 20:

TABLE 20

| GREEN PROPERTIES | Reference Comp. G | Composition G |
|---|---|---|
| GREEN DENSITY | 7.25 | 7.43 |
| GREEN STRENGTH | 2378 | 7385 |
| GREEN EXPANSION | 0.14 | 0.21 |
| STRIPPING PRESSURE | 3836 | 3746 |
| SLIDING PRESSURE | 1984 | 1480 |

The stripping and sliding pressures for the bars made from Composition G were lower than the stripping and sliding pressure for the bars made from Reference Compositions G. The green strength of the bars, made from Composition G was substantially higher than the green strength of the bars made from Reference Composition G. The green expansion of the bars made from Composition G was higher than the green expansion of the bars made from Reference Composition G. The green density of the bars made from Composition G was substantially higher than the green density of the bars made from Reference Composition G.

The bars were then sintered. The sinter properties for the compositions are shown in Table 21:

TABLE 21

| SINTER PROPERTIES | Reference Comp. G | Composition G |
|---|---|---|
| Sinter Density (g/cc) | 7.26 | 7.48 |
| TRS Strength | 211,775 | 232,701 |
| Hardness (Rockwell B) | 92.7 | 95.7 |

The sinter density and transverse rupture strength of the bars made from Composition G were higher to the sinter density and transverse rupture strength of the bars made from Reference Composition G.

Thus, the incorporation of the functionalized polyalkylene glycol lubricant results in metal powder compositions that have higher green strength and green density. Parts made from these compositions are easier to remove from the die as shown by the lower ejection forces required to remove the green bars from a die.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

What is claimed is:

1. A metallurgical powder composition comprising:
   (a) at least about 80 percent by weight of a metal-based powder; and
   (b) from about 0.01 to about 5 percent by weight, based on the total weight of the metallurgical powder composition, of a solid lubricant, wherein the solid lubricant comprises a functionalized polyalkylene glycol lubricant having the formula:

$Q_1$-$(R_1)_x$, (a), $Q_1$-$(R_1$-$Q_2)_n$-$R_2$ (b), $Q_1$-$(R_1$-$Q_2)_n$-$R_2$-$Q_3$ (c), $R_1$-$Q_1$-$(R_2$-$Q_2)_n$-$R_3$ (d), or combinations thereof wherein $Q_1$, $Q_2$, and $Q_3$ are each independently a linear or branched polyalkylene glycol, and $R_1$, $R_2$ and $R_3$ are each independently a phosphate group, phosphite group, hypophosphate, hypophosphite, polyphosphate, thiophosphate, dithiophosphate, thiocarbamate, dithiocarbamate, borate, thiosulfate, sulfate group, or sulfonate group, n is from 0 to about 10, and x is from about 1 to about 30.

2. The metallurgical powder composition of claim 1, wherein the functionalized polyalkylene glycol lubricant comprises at least about 10 percent by weight of the solid lubricant.

3. The metallurgical powder composition of claim 1 wherein functionalized polyalkylene glycol lubricant is in the form of a powder having a particle size between about 2 and about 200 microns.

4. The metallurgical powder composition of claim 1, wherein the solid lubricant further comprises at least 10 percent by weight, based on the total weight of the solid lubricant, of at least one additional lubricant comprising amines, amides, or polyamides, metal salts of polyamides, $C_{10}$ to $C_{25}$ fatty acids or fatty alcohols, metal salts of $C_{10}$ to $C_{25}$ fatty acids, or combinations thereof.

5. The metallurgical powder composition of claim 1 wherein the functionalized polyalkylene glycol lubricant comprises a polyalkylene glycol having a molecular weight range from about 1,000 to about 20,000.

6. The metallurgical powder composition of claim 1 wherein the polyalkylene glycol comprises polymethylene glycol, polyethylene glycol, polypropylene glycol, polybutylene glycol, polypentylene glycol or combinations thereof.

7. The metallurgical powder composition of claim 6 wherein the polyalkylene glycol comprises polyethylene glycol.

8. The metallurgical powder composition of claim 2, wherein the solid lubricant comprises 0.3 weight percent polyethylene glycol having phosphate functional groups and 0.3 weight percent of ethylene bis-stearamide.

9. A metallurgical powder composition comprising:
   (a) at least about 80 percent by weight of a metal-based powder; and
   (b) from about 0.01 to about 5 percent by weight of a functionalized polyalkylene glycol lubricant having the formula:

$Q_1$-$(R_1)_x$, (a), $Q_1$-$(R_1$-$Q_2)_n$-$R_2$ (b), $Q_1$-$(R_1$-$Q_2)_n$-$R_2$-$Q_3$ (c), $R_1$-$Q_1$-$(R_2$-$Q_2)_n$-$R_3$ (d), or combinations thereof wherein $Q_1$, $Q_2$, and $Q_3$ are each independently a linear or branched, polyalkylene glycol, and $R_1$, $R_2$ and $R_3$ are each independently a phosphate group, phosphite group, hypophosphate, hypophosphite, polyphosphate, thiophosphate, dithiophosphate, thiocarbamate, dithiocarbamate, borate, thiosulfate, sulfate group, or sulfonate group, n is from 0 to about 10, and x is from about 1 to about 30, wherein the metal-based powder has an outer coating of functionalized polyalkylene glycol lubricant.

10. The metallurgical powder composition of claim 9, wherein the functionalized polyalkylene glycol lubricant comprises at least about 10 percent by weight of the solid lubricant.

11. The metallurgical powder composition of claim 10 wherein functionalized polyalkylene glycol lubricant is in the form of a powder having a particle size between about 2 and about 200 microns.

12. The metallurgical powder composition of claim 10, wherein the solid lubricant further comprises at least 10 percent by weight, based on the total weight of the solid lubricant, of at least one additional lubricant comprising amines, amides, or polyamides, metal salts of polyamides, $C_{10}$ to $C_{25}$ fatty acids or fatty alcohols, metal salts of $C_{10}$ to $C_{25}$ fatty acids, or combinations thereof.

13. The metallurgical powder composition of claim 10 wherein the functionalized polyalkylene glycol lubricant comprises a polyalkylene glycol with a molecular weight from about 1,000 to about 20,000.

14. The metallurgical powder composition of claim 13 wherein the polyalkylene glycol comprises polymethylene glycol, polyethylene glycol, polypropylene glycol, polybutylene glycol, polypentylene glycol, or combinations thereof.

15. The metallurgical powder composition of claim 14 wherein the polyalkylene glycol comprises polyethylene glycol.

16. The metallurgical powder composition of claim 10, wherein the solid lubricant comprises 0.3 weight percent polyethylene glycol having phosphate functional groups and 0.3 weight percent of an ester of montanic acids having multifunctional alcohols.

17. A method of making a metallurgical powder composition comprising:
(a) providing a solid lubricant, wherein the solid lubricant comprises at least about 10 percent by weight of a functionalized polyalkylene glycol lubricant having the formula:

  (a),

  (b),

  (c),

  (d), or combinations thereof wherein $Q_1$, $Q_2$, and $Q_3$ are each independently a linear or branched, polyalkylene glycol, and $R_1$, $R_2$ and $R_3$ are each independently a phosphate group, phosphite group, hypophosphate, hypophosphite, polyphosphate, thiophosphate, dithiophosphate, thiocarbamate, dithiocarbamate, borate, thiosulfate, sulfate group, or sulfonate group, n is from 0 to about 10, and x is from about 1 to about 30; and
(b) mixing the solid lubricant with a metal-based powder to form the metallurgical powder composition, wherein the metal-based powder is present in an amount of at least about 80 percent by weight and the solid lubricant is present in an amount of from 0.01 to about 5 percent by weight, based on the total weight of the metallurgical powder composition.

18. The method of claim 17, wherein the functionalized polyalkylene glycol lubricant comprises from about 20 to about 90 percent by weight of the solid lubricant.

19. The method of claim 17, wherein the solid lubricant further comprises at least 10 percent by weight, based on the total weight of the solid lubricant, of at least one additional lubricant comprising amines, amides, or polyamides, metal salts of polyamides, $C_{10}$ to $C_{25}$ fatty acids or fatty alcohols, metal salts of $C_{10}$ to $C_{25}$ fatty acids, or combinations thereof.

20. The method of claim 17, further comprising the step of admixing the metal-based powder with from about 0.001 weight percent to about 1.0 weight percent of a binder, based on the total weight of the metallurgical powder composition.

21. The method of claim 17 wherein the metallurgical powder composition is formed by coating the metal-based powder with the polyalkylene glycol lubricant.

22. A method of making a metal part comprising:
(a) providing a metallurgical powder composition comprising:
   (i) at least about 80 percent by weight of a metal-based powder; and
   (ii) from about 0.01 to about 5 percent by weight, based on the total weight of the metallurgical powder composition, of a solid lubricant, wherein the solid lubricant comprises at least about 10 weight percent of a functionalized polyalkylene glycol lubricant having the formula:

  (a),

  (b),

  (c),

  (d), or combinations thereof wherein $Q_1$, $Q_2$, and $Q_3$ are each independently a linear or branched, polyalkylene glycol, and $R_1$, $R_2$ and $R_3$ are each independently a phosphate group, phosphite group, hypophosphate, hypophosphite, polyphosphate, thiophosphate, dithiophosphate, thiocarbamate, dithiocarbamate, borate, thiosulfate, sulfate group, or sulfonate group, n is from 0 to about 10, and x is from about 1 to about 30;
(b) compacting the metallurgical powder composition at a pressure of at least about 5 tsi to form a metal part.

23. The method of claim 22, the solid lubricant further comprising at least 10 percent by weight, based on the total weight of the solid lubricant, of at least one additional lubricant comprising amines, amides, or polyamides, metal salts of polyamides, $C_{10}$ to $C_{25}$ fatty acids or fatty alcohols, metal salts of $C_{10}$ to $C_{25}$ fatty acids, or combinations thereof.

24. The method of claim 22, further comprising the step of admixing the metal-based powder with from about 0.001 weight percent to about 1.0 weight percent of a binder, based on the total weight of the metallurgical powder composition.

25. The method of claim 22, wherein the metal-based powder is coated with the solid lubricant.

26. The method of claim 22, wherein the metallurgical powder composition is compressed at a compaction pressure greater than about 50 tsi.

27. The method of claim 22, wherein the metallurgical powder composition is compressed at a compaction pressure of from about 60 tsi to about 120 tsi.

28. The method of claim 22, wherein the metallurgical powder composition is compressed at a compaction pressure greater than about 120 tsi.

29. A method for preparing a solid lubricant composition for use in metallurgical powder compositions, comprising the steps of:
reacting from about 90% to about 99% by weight of a polyalkylene glycol with from about 10% to about 1% by weight of a functionalized reactant for from about 0.5 to about 15 hours at from about 65 to about 130 degrees Centigrade to form a reaction product;
wherein the polyalkylene glycol is polyethylene glycol having a molecular weight from about 1,000 to about 20,000, and the functionalized reactant is phosphorus pentoxide; and
cooling the reaction product to a solid.

30. A method for preparing a solid lubricant composition for use in metallurgical powder compositions, comprising the steps of:
  reacting from about 90% to about 99% by weight of a polyalkylene glycol with from about 10% to about 1% by weight of a functionalized reactant for from about 0.5 to about 15 hours at from about 65 to about 130 degrees Centigrade to form a reaction product;
  wherein from about 97% to about 98% by weight of a polyethylene glycol is reacted with from about 3% to about 2% by weight of phosphorus pentoxide for from about 2 to about 4 hours at from about 70 to about 85 degrees Centigrade; and
  cooling the reaction product to a solid.

31. The method of claim 29 wherein the solid lubricant composition has a melting temperature range from about 55 to about 80 degrees Centigrade.

32. The method of claim 29 wherein the solid lubricant has a weight average particle size from about 2 to about 200 microns.

33. The method of claim 30 wherein the solid lubricant composition has a melting temperature range from about 55 to about 80 degrees Centigrade.

34. The method of claim 30 wherein the solid lubricant has a weight average particle size from about 2 to about 200 microns.

* * * * *